March 18, 1958     C. P. DE BIASI     2,827,205
MATERIAL SPREADER FOR A VEHICLE
Filed Feb. 21, 1955     2 Sheets—Sheet 1
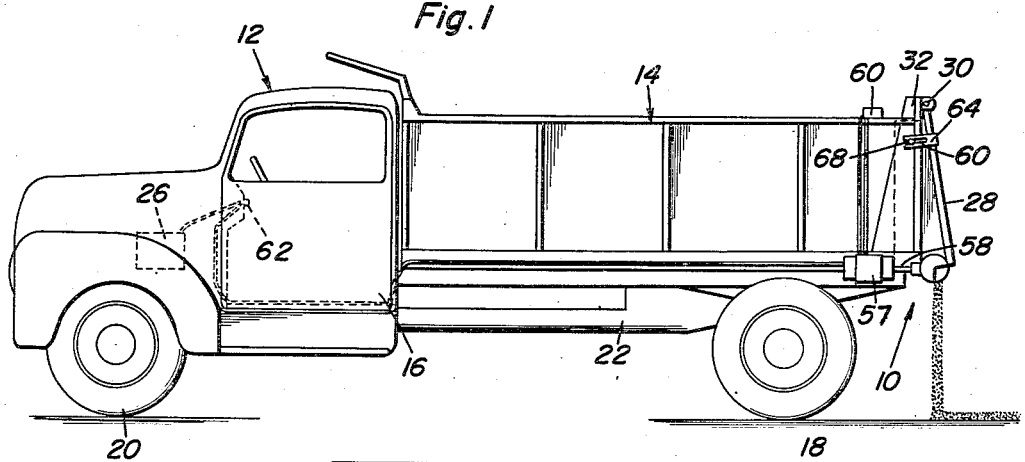
Charles P. deBiasi
INVENTOR.

March 18, 1958     C. P. DE BIASI     2,827,205
MATERIAL SPREADER FOR A VEHICLE
Filed Feb. 21, 1955     2 Sheets-Sheet 2
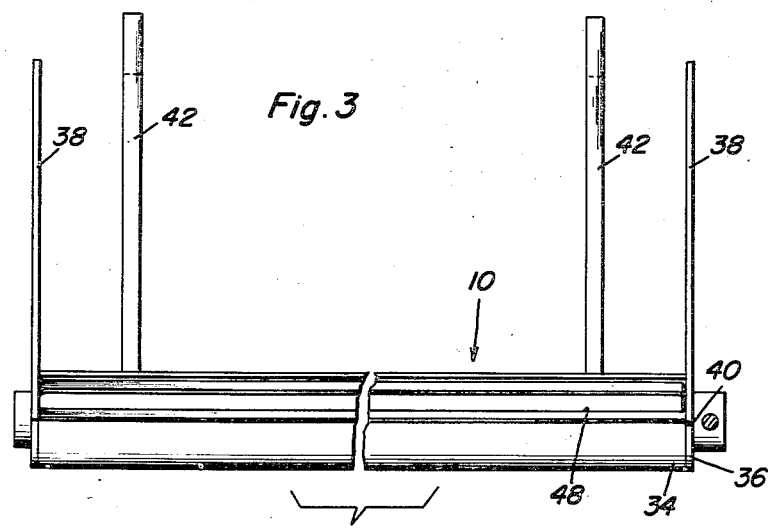
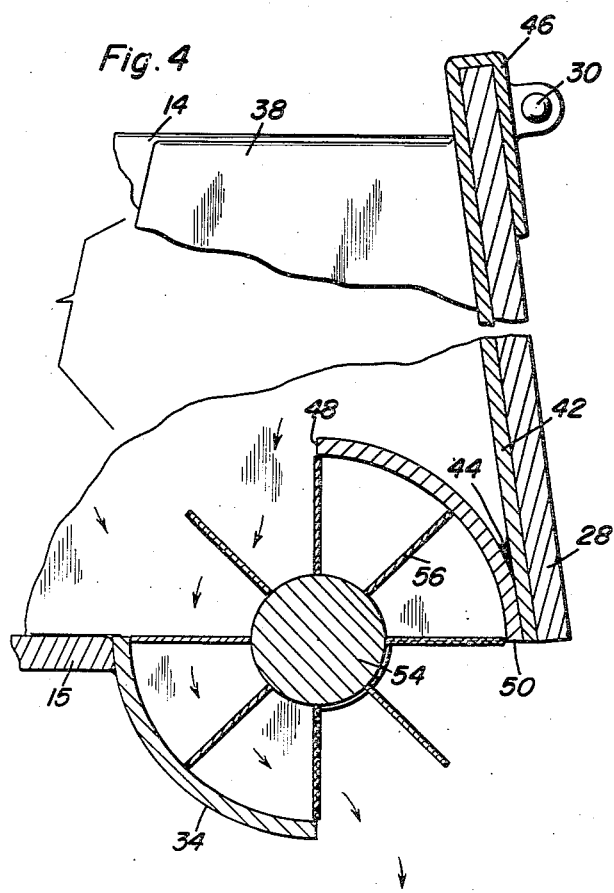
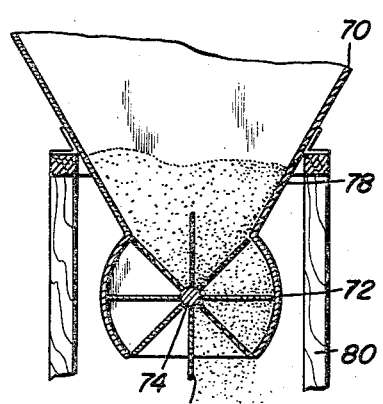
Charles P. deBiasi
INVENTOR.

United States Patent Office 2,827,205
Patented Mar. 18, 1958

2,827,205

MATERIAL SPREADER FOR A VEHICLE

Charles P. de Biasi, Waterford, Conn.

Application February 21, 1955, Serial No. 489,337

1 Claim. (Cl. 222—178)

This invention generally relates to a spreader or dispenser for use in controlling the discharge for various types of granular material, such as sand, stone, cement, salt, fertilizer or the like from a storage receptacle to another area so that the quantity and rate of discharge may be easily controlled.

An object of the present invention is to provide a material spreader especially adapted for use in conjunction with vehicle dump bodies so that fertilizer or lime or similar material may be discharged from the body onto the field in a controlled manner.

Another object of the present invention is to provide a material spreader that will accurately spread the desired amount of material along a desired surface in which the material discharge may be controlled remotely from the vehicle operator's cab or from a position of observance by an operator.

A further important object of the present invention is to provide a material spreader having a positive volume control discharge that is accurately and positively controlled by the operator.

Other important objects of the present invention will reside in its simplicity of construction, ease of attachment to vehicle bodies, long lasting ruggedness of construction, positive volume or quantity control, its adaptation for its intended purposes and relatively inexpensive manufacturing costs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a dump truck with the material spreader of the present invention attached to the rear thereof;

Figure 2 is a rear end elevational view of the construction of Figure 1;

Figure 3 is a front elevational view of the material spreader attachment shown in use in Figure 1;

Figure 4 is a vertical sectional view taken substantially upon a plane passing along section line 4—4 of Figure 2, showing the details of construction of the interior of the material spreader and its relationship with the vehicle body, tail gate and other elements of the invention; and Figure 5 is a sectional view showing a similar material spreader utilizing a stationary type of receptacle or material holding box.

Referring now specifically to the drawings, it will be seen that the numeral 10 generally designates the material spreader of the present invention attached to the rear of a vehicle generally designated by the numeral 12 having a dump body generally designated by the numeral 14 thereon. The vehicle 12 includes the usual cab 16, ground engaging driving wheels 18, ground engaging steering wheels 20, a supporting frame member 22, supporting springs 24 and a battery 26 for supplying electrical energy to various electrical devices on the vehicle 12. The dump body 14 includes the usual tail gate 28 pivotally attached to its upper end by a pivot pin 30 to the usual tail gate brackets 32. Also, suitable means is provided for raising and lowering the dump body 14 in the usual manner, and the details thereof are not illustrated since it forms no part of the present invention.

The material spreader 10 includes an elongated tubular member 34 having closed ends 36 and vertically extending plates 38 formed integrally therewith and including a forwardly projecting ledge 40 for engagement with the bottom of the truck body 14. The tubular member 34 is provided with a pair of upstanding straps 42 secured thereto by suitable welding or the like 44 and terminating at their upper ends in reversely bent hook members 46 for hooking over the upper edge of the tail gate 28, thereby mounting the tubular member transversely of the vehicle body 14. It will be seen that the tubular member 34 is disposed between the partially open tail gate 28 and the bottom of the body 14 which is designated by the numeral 15. As illustrated in Figure 4 as well as in Figure 1, the vertical plates 38 form a closure between the rear end of the body 14 and the tail gate 28, thereby guiding the material to a position overlying the transverse tubular member 34. The upper forward portion of the transverse tubular member 34 is provided with an elongated entrance or inlet slot 48, and the lower rear portion thereof is provided with an elongated exit or discharge slot 50, both of which extend substantially through 90° of the tubular member 34.

Rotatably journaled in bearings 52 at each end of the tubular member 34 is an elongated shaft 54 having a plurality of radially extending fins 56 equally spaced on the periphery of the shaft 54 and terminating closely adjacent the inner surface of the tubular member 34 wherein material will be discharged through the tubular member 34 at a predetermined rate in accordance with the speed of rotation of the shaft 54. An electric or fluid motor 57 is provided with a drive shaft 58 which drives one end of the shaft 54 for rotation thereof and a control switch 60 is provided on the truck body 14 and also in the cab 16, as designated by the numeral 62, for controlling operation of the motor 57. Electrical power for operating the motor 57 is provided from the battery 26, whereby the rotation of the shaft 54 and the fins 56 thereon may be effected for discharging the material from the truck body to the ground surface or other surface at a predetermined rate depending upon the speed of the shaft 54. Also, it will be noted that the tail gate 28 is provided with L-shaped brackets 64 having slots 66 therein for receiving a fastening bolt 68 wherein the tail gate 28 may be locked into position in relation to the truck body 14 for retaining the tail gate 28 and the truck body 14 in adjusted position.

As illustrated in Figure 5, a stationary chute or box 70 is provided with a tubular portion 72 at the lower portion thereof wherein a shaft 74 is rotatably journaled therein and provided with a plurality of radial fins 76 thereon for controlling the discharge of material 78 from the box 70. A suitable support 80 is provided for holding the box 70 in the desired position, and any suitable means may be provided for rotation of the shaft 74 wherein the radial blades or fins will coact with the curved surfaces formed in the tubular member 72 whereby a predetermined quantity of material will be discharged as the rotation of the shaft 74 is effected.

It will be understood that at least two fins are at all times disposed between the openings 48 and 50, thereby assuring that the material will be accurately and positively controlled, and that no material will be discharged through the tubular member 34 unless the shaft 54 is being driven. The shaft 54 is driven by an electric motor 57 that may be controlled from the cab of a vehicle 12 or may be controlled by an operator by utilizing the switch 60 wherein accurate control of the spreading operation may be effected. It will be understood that other types of driving means may be utilized, and the spreading device of the present invention may be utilized in any type of orientation wherein it is desired that the volume or quantity of material be accurately and positively controlled.

The foregoing is considered as illustrative only of the principles of the present invention. Further, since numerous modifications and equivalents may readily occur to those skilled in the art, it is not desired to limit the invention to the exact construction and operation as described and claimed, and accordingly, all suitable modifications and equivalents may be resorted to, falling within the scope of the appended claim.

What is claimed as new is as follows:

A material spreader for attachment to a dumpable vehicle body having a pivotal tail gate and means adjustably retaining said tail gate in partially opened position, said spreader including an elongated closed end tubular member extending transversely of the vehicle body between the rear end thereof and the bottom of the tail gate, said tubular member having a pair of diametrically and oppositely disposed slots between the closed ends thereof, one slot forming an inlet and the other slot forming a discharge opening, said inlet communicating with the body, a shaft rotatably journaled in the ends of and extending from end to end of said tubular member, a plurality of equally spaced radial fins on said shaft terminating closely adjacent the interior surface of said tubular member the circumferential length of the slots being equal to each other and equal to the circumferential length of the tubular member between the slots, said fins being spaced with the circumferential distance between adjacent fins along the path of movement of the outer edges thereof being generally equal to one-half of the circumferential length of the slot whereby at least two fins are in registry with each of the slots and the portions of the tubular member between the slots at all times thereby assuring complete filling and emptying of the space between adjacent fins and precluding passage of material between the outer edges of the fins and the tubular member, means for driving said shaft independently of forward movement of the body, means for controlling said driving means, brackets attached to the rear surface of said tubular member for detachable engagement with the tail gate, and guide plates on the ends of said tubular member projecting forwardly against the inner surface of the sides of the vehicle body and into engagement with the end edges of the tail gate thereby forming a closure for the rear end of the vehicle body and guiding the material into the inlet of the tubular member, each of said brackets including an elongated strap extending along the inner surface of the tail gate with a reversely bent hook on the upper end thereof for detachable engagement over the upper edge of the tail gate, said tubular member forming a closure between the rear edge of the bottom of the body and the bottom edge of the tail gate whereby the fins will dispense a predetermined quantity of material for each revolution of the shaft.

References Cited in the file of this patent

UNITED STATES PATENTS

| 1,009,805 | Tarrant | Nov. 28, 1911 |
| 1,309,059 | Bacon | July 8, 1919 |
| 1,606,676 | Urann | Nov. 9, 1926 |
| 2,484,325 | Wachter | Oct. 11, 1949 |
| 2,698,184 | Bowen | Dec. 28, 1954 |
| 2,715,972 | Grygiel | Aug. 23, 1955 |

FOREIGN PATENTS

| 769,499 | France | June 9, 1934 |